United States Patent [19]

Cuevas

[11] Patent Number: 5,286,054
[45] Date of Patent: Feb. 15, 1994

[54] ASPIRATING/VENTING MOTOR VEHICLE PASSENGER AIRBAG MODULE

[75] Inventor: Jess Cuevas, Scottsdale, Ariz.

[73] Assignee: Talley Automotive Products, Inc., Phoenix, Ariz.

[21] Appl. No.: 826,015

[22] Filed: Jan. 27, 1992

Related U.S. Application Data

[63] Continuation of Ser. No. 445,802, Dec. 4, 1989, abandoned.

[51] Int. Cl.$^5$ .............................................. B60R 21/30
[52] U.S. Cl. ....................................... 280/738; 280/741
[58] Field of Search ............... 280/728, 730, 731, 732, 280/736, 738, 739, 740, 741, 742

[56] References Cited

U.S. PATENT DOCUMENTS

| | | | |
|---|---|---|---|
| Re. 29,228 | 5/1977 | Hass | 280/738 |
| Re. 32,584 | 1/1988 | Pietz | 280/741 X |
| 2,976,907 | 3/1961 | Harvey et al. | 72/56 |
| 3,632,133 | 1/1972 | Hass | 280/738 |
| 3,675,942 | 7/1972 | Huber | 280/738 |
| 3,762,741 | 10/1973 | Fleck et al. | 280/729 |
| 3,767,225 | 10/1973 | Mazelsky | 280/729 |
| 3,773,350 | 11/1973 | Shibamoto | 280/729 |
| 3,773,351 | 11/1973 | Catanzarite | 280/738 |
| 3,784,225 | 1/1974 | Fleck et al. | 280/729 |
| 3,788,663 | 1/1974 | Weman | 280/729 |
| 3,791,666 | 2/1974 | Shibamoto | 280/729 |
| 3,819,205 | 6/1974 | Dunford et al. | 280/731 |
| 3,843,152 | 10/1974 | Nonaka | 280/739 |
| 3,895,098 | 7/1975 | Pietz | 423/351 |
| 3,909,037 | 9/1975 | Stewart | 280/732 |
| 3,910,595 | 10/1975 | Katter et al. | 280/732 |
| 4,005,876 | 2/1977 | Jorgensen et al. | 280/741 |
| 4,153,273 | 5/1979 | Risko | 280/732 |
| 4,278,638 | 7/1981 | Nilsson et al. | 280/731 |
| 4,400,010 | 8/1983 | Stütz et al. | 280/732 |
| 4,547,342 | 10/1985 | Adams et al. | 280/741 |
| 4,604,151 | 8/1986 | Knowlton et al. | 280/736 |
| 4,758,287 | 7/1988 | Pietz | 280/728 |
| 4,877,264 | 10/1989 | Cuevas | 280/738 |
| 4,907,819 | 3/1990 | Cuevas | 280/736 |
| 4,919,897 | 4/1990 | Bender et al. | 280/731 |
| 4,923,212 | 5/1990 | Cuevas | 280/731 |
| 4,950,458 | 8/1990 | Cunningham | 280/741 |
| 5,058,921 | 10/1991 | Cuevas | 280/741 |

FOREIGN PATENT DOCUMENTS

| | | | |
|---|---|---|---|
| 0399498 | 11/1990 | European Pat. Off. | 280/741 |
| 2150744 | 5/1973 | Fed. Rep. of Germany | 280/736 |
| 2335373 | 7/1977 | France | 280/732 |
| 1324401 | 7/1973 | United Kingdom | 280/738 |
| 1420340 | 1/1976 | United Kingdom | 280/738 |
| 2218698 | 11/1989 | United Kingdom | 280/736 |

Primary Examiner—David M. Mitchell
Assistant Examiner—Paul Dickson
Attorney, Agent, or Firm—Tarolli, Sundheim & Covell

[57] ABSTRACT

A modularized aspirating/venting motor vehicle passenger passive restraint assembly. A first embodiment utilizes two separate inflator units lockingly engaged within a stamped mounting plate which, in turn, is installed within an outer base plate. Both plates comprise a lower depending skirt portion defining an aperture through a lower portion of the corresponding plate. These apertures are located in substantially vertical alignment when the mounting plate is seated within the base plate. An elongated conduit permits a reciprocal fluid flow between the interior of the module and the ambient atmosphere. A first end of the conduit is inserted through the corresponding apertures in the base plate and mounting plate to a location adjacent the inflator units and secured therein by magnaforming the overlapping skirt portions into a groove on the conduit's outer surface. A second end of the conduit extends through an inner structural wall of the vehicle to a location outside of the passenger compartment. A second embodiment of the invention utilizes a single linear, bilateral inflator device having first and second combustion chambers secured at opposite end thereof to a central T-shaped support. The lower leg of the support is grooved to facilitate sealing the inflator to the base plate by magnaforming the base plate skirt into the groove. No mounting plate is required. The elongated conduit is releasably attached to a terminal end of the lower support leg by a fitting and extends out of the vehicle passenger compartment to permit fluid communication with the ambient atmosphere.

39 Claims, 4 Drawing Sheets

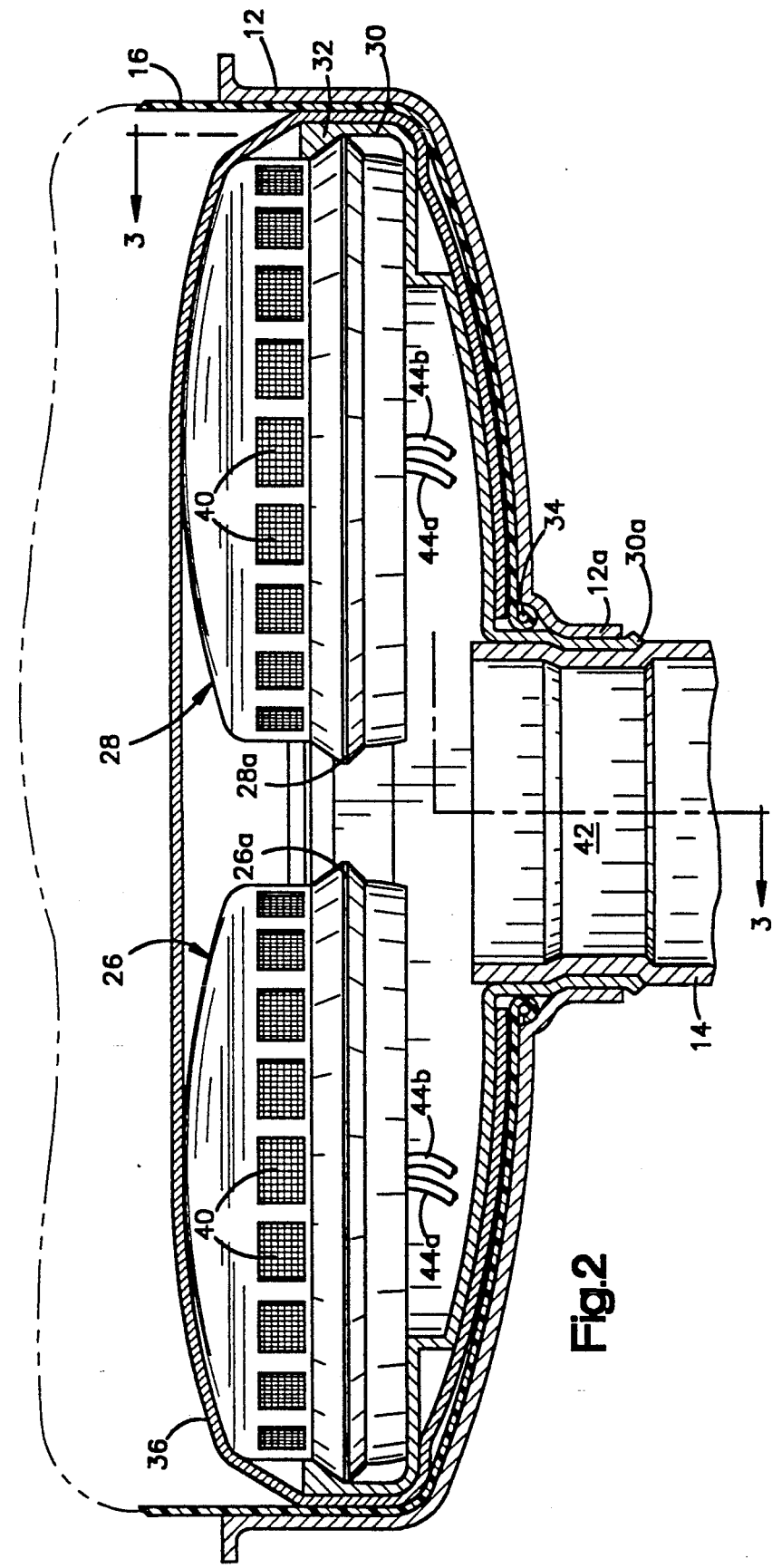

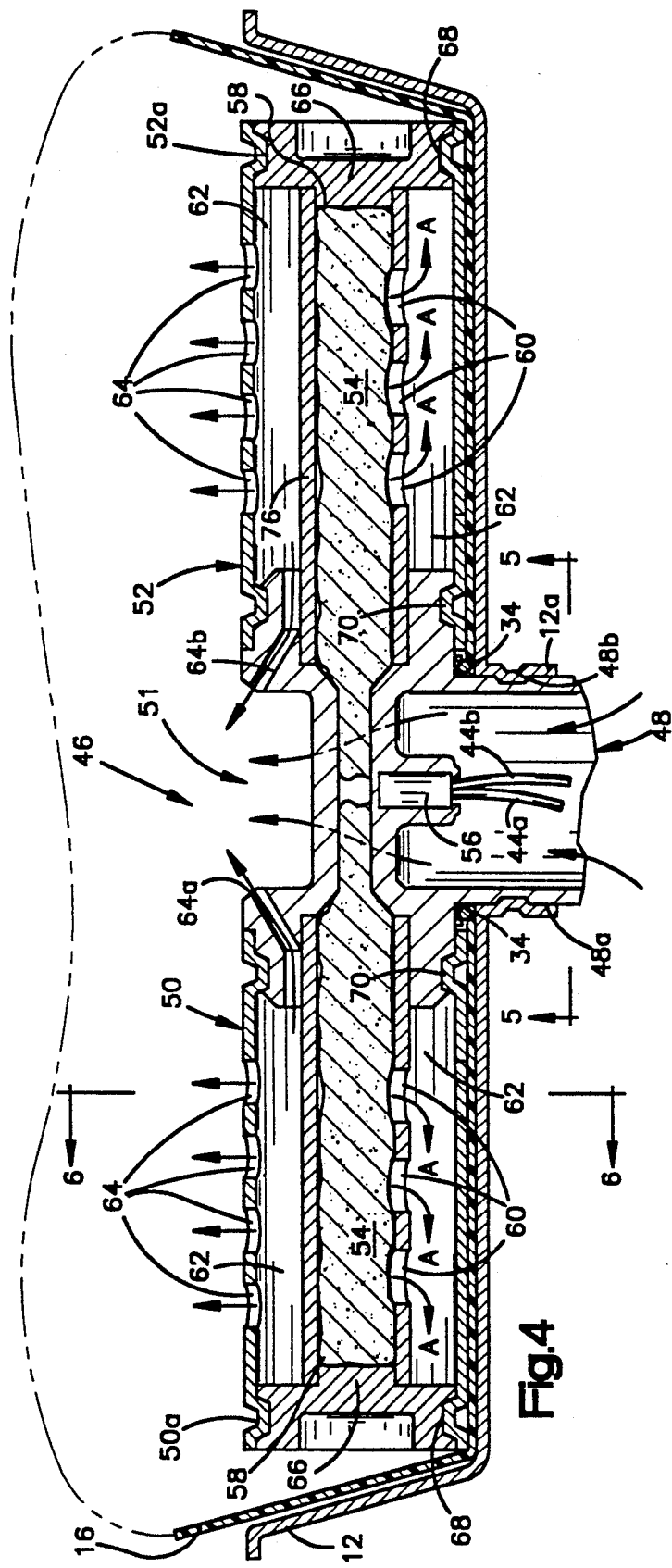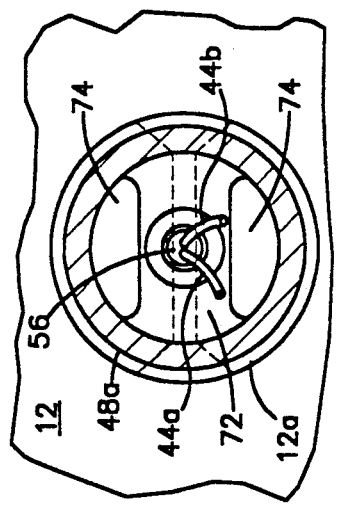

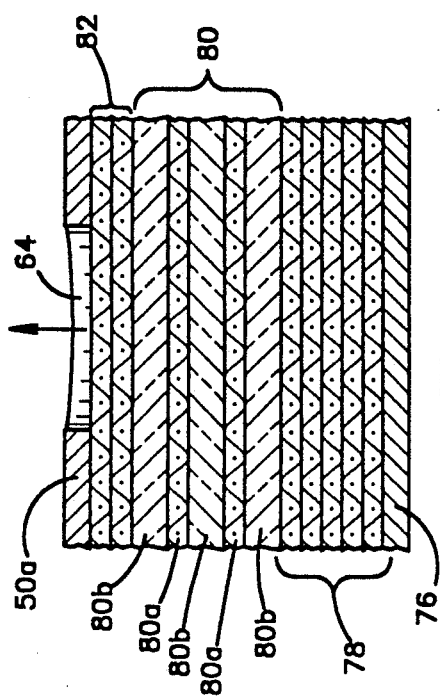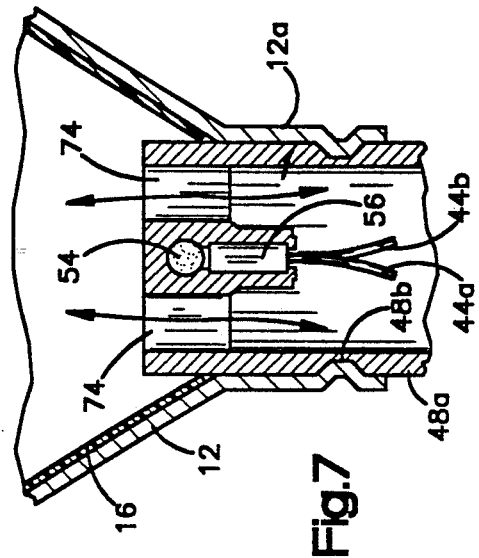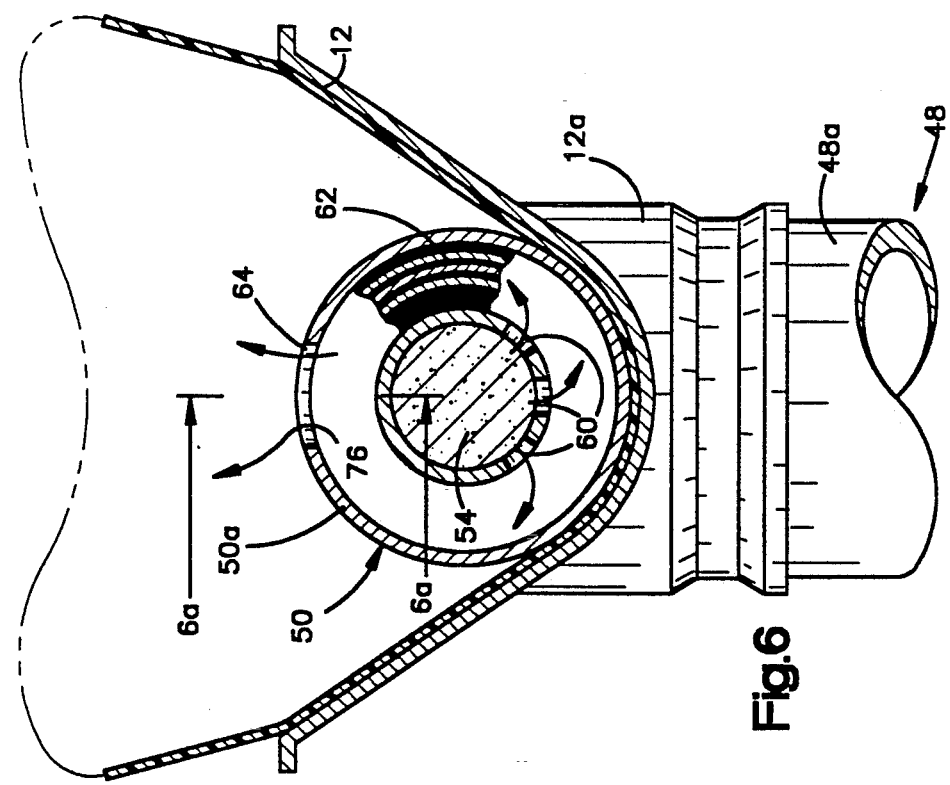

and further wherein the gaseous contents of the inflated air bag are subsequently vented completely out of the vehicle's passenger compartment upon deflation of the air bag.

ASPIRATING/VENTING MOTOR VEHICLE PASSENGER AIRBAG MODULE

This is a continuation of copending application Ser. No. 07/445,802 filed on Dec. 4, 1989, now abandoned.

TECHNICAL FIELD

The invention relates generally to motor vehicle passive restraint systems and more particularly to a modularized passenger side passive restraint assembly wherein ambient air from outside the vehicle is aspirated into the air bag together with the gaseous combustion products produced by the inflator component to facilitate bag deployment and further wherein the gaseous contents of the inflated air bag are subsequently vented completely out of the vehicle's passenger compartment upon deflation of the air bag.

BACKGROUND OF THE INVENTION

Thousands of people are killed or injured annually in motor vehicle accidents wherein the vehicle driver and/or passengers are thrown forward as a result of the initial, i.e., primary, collision so as to impact against the solid surfaces forming the interior of the vehicle. As a result, passive restraint systems adapted for use with such vehicles have been developed for the purpose of reducing or eliminating these injuries and/or deaths.

One system which has been extensively investigated senses rapid vehicle deceleration, such as that which occurs upon a primary impact between an automobile and, for example, another vehicle. Upon receipt of a signal from a remote sensor device, the system initiates inflation of an expandable passive restraint, i.e., an air bag, prior to the occurrence of any secondary collision between the driver and/or passengers and the interior of the automobile. The expandable restraint is normally inflated by the combustion products produced by a pyrotechnic gas generator, i.e., inflator, device (Note: the terms "gas generator" and "inflator" are used interchangably herein). This restraint is interposed between the interior surface of the automobile and one or more occupants of the vehicle. The air bag must therefore be inflated within milliseconds of the primary impact in order to ensure that the vehicle occupants' forward motion is arrested before injury occurs due to the secondary collisions against the adjacent solid interior surfaces.

Moreover, it is additionally desirable to ensure deflation of the restraining device as soon as the force of a crash is expended, so that the occupant(s) do not thereafter become trapped within the vehicle subsequent to the collision. In order to meet such criteria, specifications have been established whereby the expandable bag should be sufficiently inflated to restrain a vehicle occupant in about 30-60 milliseconds after initiation, with substantial deflation occurring after about 100 milliseconds.

Moreover, as is well understood by those practicing in this art, pyrotechnic inflators such as those described above may be fabricated and/or adapted in a variety of different configurations depending upon the particular response characteristics required for the intended application. One particularly important consideration in this regard is as to whether the inflator unit is to be mounted upon the steering wheel to restrain the vehicle operator, or whether it is intended to protect, for example, the front seat passengers. In the latter case, the device is normally installed within the vehicle's dashboard adjacent the passenger side of the vehicle. A different set of requirements must be met depending upon which mode of use is intended.

That is, an inflator unit intended for installation on the driver's side, e.g., within the steering assembly, of an automobile must be smaller in size than a passenger side unit to enable it to fit within the steering wheel. It must additionally generate a gaseous combustion product up to two times faster than a passenger side unit due to the minimal separation between the driver and the steering wheel in comparison to the available space between the body of a passenger within the vehicle and the vehicle's dashboard. Moreover, a passenger side inflator device is required to produce up to four times as much gas as a driver's side inflator to completely inflate the correspondingly larger passenger side air bag. This increase in bag size is necessitated due to the relatively larger volume of space within the vehicle in which the passenger may be found, as opposed to the driver who is "locked" into a position behind the steering wheel. Numerous examples of passenger side inflator devices are known in the prior art, such as that disclosed, for example, in U.S. Pat. No. 4,005,876 to Jorgensen et al.

Commonly encountered features among pyrotechnic gas generators utilized within motor vehicle passive restraint devices of the type described above include: (1) an outer metal housing, e.g., of steel or aluminum, (2) a gas generant composition located within the housing, (3) means to ignite the gas generant responsive to a signal received from a sensor positioned at a location removed from the inflator, and (4) means to filter and to cool the gas, positioned between the propellant composition and a plurality of gas discharge ports, i.e., orifices defined by the generator housing.

Such pyrotechnic gas generators must be capable of withstanding enormous thermal and mechanical stresses for a short period during the gas generation process. Thus, most inflators that have been and are currently being used with automobile air bag devices are commonly fabricated using heavy gauge steel for the casing and other structural housing components, with these components being joined together by, for example, threaded screws, roll crimping or welding. The recent emphasis on weight reduction for the purpose of fuel conservation in motorized vehicles has, however, created a need and a demand for a lighter weight inflation system. One example of such a system is illustrated in U.S. Pat. No. 4,547,342 to Adams et al. disclosing an aluminum driver's side inflator unit.

A further advance in the field of motor vehicle passive crash restraints involves the inclusion of aspiration means for drawing ambient air, e.g., from within the vehicle's passenger compartment into the air bag so as to cool the gas entering the bag from a pyrotechnic inflator operatively associated therewith. This arrangement thus permits a more rapid inflation of the air bag than would otherwise be possible upon utilizing only the gas produced by the inflator device.

Various types of aspirating inflators are known in the prior art. Generally speaking however, these devices are typically adapted for installation within the driver's side of the vehicle. For example, a number of references disclose arrangements wherein the interior of the air bag is in fluid communication with the atmosphere within the vehicle through a unidirectional valve. Such valves permit air from within the vehicle to enter the interior of the bag, thus facilitating its inflation. These valves subsequently prevent the atmosphere within the bag from venting back out along the same path, thus requiring the provision of some means (e.g., such as vents or blow-out patches) for permitting the gasses to escape through the fabric of the bag itself. Examples of air bag systems of the type described above may be found in U.S. Pat. Nos. 3,675,942 to Huber; 3,767,225 to Mazelsky; 3,773,350 and 3,791,666 to Shibamoto; 3,788,663 to Weman; and 3,909,037 to Stewart.

Alternately, a number of other references disclose air bag inflator assemblies wherein the flow of ambient atmosphere proceeds in two directions, i.e., initially, from within vehicle into the air bag and then, subsequent to the collision, gradually back into the interior of the vehicle, so as to facilitate the deflation of the air bag as well. Air bag devices of this type are disclosed, for example, in U.S. Pat. Nos. 3,762,741 and 3,784,225 to Fleck et al.; 3,773,351 to Catanzarite; 3,843,152 to Nonaka and 3,910,595 to Katter et al.

In a further alternate arrangement, ambient air from within the vehicle is initially aspirated into the air bag upon initiation of the system response due to the occurrence of a collision, following which the entire contents of the bag, comprising the gaseous products supplied by the inflator in admixture with the ambient atmosphere, is subsequently directed entirely out of the vehicle into the surrounding space. An example of this type of arrangement for a driver's side air bag apparatus is illustrated in U.S. Pat. No. Re 29,228 to Hass (i.e., a reissue of U.S. Pat. No. 3,632,133) wherein the air bag is inflated under the combined influence of a high velocity stream of gas produced by a pyrotechnic gas inflator device and a relatively large volume of air drawn into the bag by the passage of the high-velocity gas. The air may, if desired, be drawn from outside the vehicle through a conduit assembly extending through the steering column, and it may be subsequently discharged through the same conduit to the outside of the vehicle.

In addition, to facilitate the installation and maintenance of some air bag assemblies, they may be produced in modular form, as described for example, in U.S. Pat. No. 3,819,205 to Dunford et al. which discloses a driver's side air bag module.

Applicant is unaware, however, of any modularized air bag system for use on the passenger side of a motor vehicle which includes means, such as those described above, for aspirating ambient air, either from within or without the passenger compartment of the vehicle, and directing these additional gases into the air bag so as to facilitate the inflation thereof. Moreover, there is additionally no teaching in the prior art of such a modularized assembly wherein the gaseous mixture from within the air bag is vented completely out of the vehicle and into the surrounding space to facilitate deflation of the bag, while also avoiding the generation of an abrupt pressure increase within the vehicle which is known to be injurious to the occupants thereof.

SUMMARY OF THE INVENTION

The present invention thus concerns an improved modularized design for a motor vehicle passenger passive restraint, i.e., air bag, assembly adapted for installation within a dashboard portion of the vehicle in order to protect passengers within said vehicle from being injured or killed as a result of a collision involving said vehicle.

It is thus an object of the present invention to provide a modularized passenger passive restraint assembly having means to permit the aspiration of exterior air through the module and into the inflatable air bag component, and subsequently, to permit a reverse flow of the atmosphere within the bag out of the vehicle's passenger compartment and into the surrounding environment.

It is a further object of the invention to provide a modularized aspirating/venting passenger air bag assembly as described above, adapted for substantially inflating a passenger air bag by the combustion of a reduced amount of a solid propellant composition relative to that normally required to inflate such a cushion, due to the cumulative effect of the aspirated air in inflating and deploying the air bag.

It is a still further object of the present invention to provide an aspirating/venting modularized passenger air bag system which may be assembled utilizing a minimum number of parts at a reduced number of work stations while enhancing the strength of the structural bonds formed among the various components.

It is an additional object of the present invention to provide an aspirating/venting modularized passenger air bag passive restraint assembly which may be fabricated without the use of fasteners such as bolts or screws, which are typically required in the prior art to maintain the various components of such devices in operative association.

Another object of the present invention is to provide an aspirating/venting modularized passenger air bag system adapted to simultaneously supply at least two different amounts of a gaseous product, produced due to the combustion of a pyrotechnic gas-generating composition, to different portions of the passenger air bag so as to create at least two zones of differential pressure within the air bag upon actuation of the inflator.

It is a further object of the present invention to provide a modularized aspirating/venting passenger air bag system capable of inflating an upper portion of the air bag associated therewith with a relatively greater amount of gaseous combustion product than that which is directed to a lower portion of the bag so as to form at least two zones of differential gas pressure within the bag such that lower portion of the bag is relatively less pressurized than an upper portion thereof.

The present invention thus comprises a modularized aspirating/venting motor vehicle passenger passive restraint assembly. In a first embodiment of the invention, the module comprises two separate and discrete inflator units, each having a combustion chamber, positioned within a stamped metal mounting plate in adjacent horizontal relation to each other and lockingly engaged therein by a structural seal formed with the plate. The seal is created by magnaforming a curved finger portion comprised of an upper peripheral edge of the mounting plate against a rounded arcuate shoulder extending along at least a portion of each inflator housing. The mounting plate/inflator assembly is thereafter inserted within a base plate which forms the outer shell of the module.

Sandwiched between the base plate and the mounting plate is a mouth portion of the air bag component of the module. To facilitate maintaining the bag in this position, a flexible bead, such as an elastomeric O-ring, is sewn into the bag mouth and trapped between the base plate and the mounting plate when the module is sealed together. Thus, the inflators are entirely enclosed within the confines of the bag without the need for positioning and aligning a plurality of fasteners such as screws or bolts to secure the bag thereto as was previously required.

The mounting plate and the base plate of the module each comprise a lower depending skirt portion formed integrally therewith such that each skirt defines an aperture within a base portion of the respective plate. Upon positioning the mounting plate with its attendant inflator units within the base plate, the apertures within both said plates are located in substantially vertical alignment. These apertures are configured and adapted to accept a first grooved end of an elongated conduit member configured and adapted to permit a reciprocal fluid flow between the interior of the air bag and the ambient atmosphere surrounding the vehicle. The conduit member is preferably formed from a material such as an engineering thermoplastic (e.g., polyvinyl chloride) or a lightweight, high tensile strength metal such as aluminum, titanium and certain stainless steels (e.g., 201 or 304 stainless steel).

Upon insertion of the first end of the conduit into the module through the apertures in the base plate and the mounting plate, the upper terminal end thereof is positioned below and substantially between the two inflator devices. A structural seal is thereafter formed with both the mounting plate and the base plate by magnaforming the overlapping skirt portions of both of these plates into the groove on the conduit's first end in a single forming operation. The conduit is dimensioned and configured such that its second end passes either through the firewall or the floorboards of the vehicle.

A second embodiment of applicant's module utilizes a single linear, bilateral inflator device in place of the two separate units described above. The subject bilateral inflator comprises first and second combustion chambers, within respective housings, positioned in a substantially horizontal plane at, respectively, first and second terminal ends of the inflator. A central T-shaped portion of the inflator having first and second opposed grooved ends is located between the two combustion chambers. These chambers are connected by a structural seal at a first inner end thereof to, respectively, the first and second grooved ends of this T-shaped portion. The central inflator portion thus serves as a structural support for the combustion chambers. Moreover, the lower leg portion of this T-shaped central support comprises a tubular extension projecting substantially perpendicularly to the longitudinal axis of the horizontally disposed combustion chambers. This extension houses means such as an electrically actuated pyrotechnic squib for initiating combustion of the main propellant charge located within the first and second combustion chambers.

The embodiment of the invention utilizing the linear bilateral inflator requires no mounting plate such as that described above for use with the two separate inflator units. Rather, in the subject embodiment, the base plate of the module is magnaformed directly into a groove located along at least a portion of the projecting tubular extension on the central support, thus forming a structural seal between the inflator and the base plate.

In addition, in a manner similar to that discussed above with reference to the first embodiment of the invention, the mouth of the bag, containing a flexible bead, is simply trapped in place between the base plate and the inflator unit when the base plate is magnaformed to the inflator device. This arrangement results in the entire inflator being completely enclosed within the air bag.

Following the magnaforming operation, an elongated conduit member is joined at a first end by a fitting to the lower leg of the central support member in a manner well-known in the art. As in the earlier-described embodiment of the invention, the second end of the conduit may be routed through either the firewall or the floorboards of the vehicle. The subject conduit thus provides fluid communication between the interior of the air bag and the atmosphere external to the vehicle. This arrangement permits ambient air to be aspirated into the air bag through the module upon actuation of the inflator device. Subsequently, the admixture of pyrotechnic combustion products and ambient air may be vented from the air bag through the conduit member to the exterior of the vehicle.

With the use of the subject bilateral inflator device, differing amounts of propellant or entirely different propellants may be placed within each of the inflator's combustion chambers in order to vary the amount of gaseous product produced by each said chamber. The chamber generating the larger volume of gas may thus be oriented within the air bag so as to direct its gas flow towards the upper portion thereof, where an adult passenger would be expected to make contact in the event of a collision involving the vehicle. Conversely, the remaining combustion chamber of the inflator, adapted by means of its different or lower propellant load to generate a comparatively reduced amount of gaseous product in comparison to the first chamber, may be aligned so as to direct the flow of gas produced thereby to the lower portion of the bag. This arrangement provides a softer cushion in the zone wherein a child, seated either upon the lap of an adult passenger, or standing on the floor between the dashboard and the front seat, would be expected to strike the bag, thus reducing if not eliminating the chance for serious injury and/or death to such minor passengers in the event of a collision. Conversely, the upper zone of the air bag is thus more fully inflated and therefore is more able to absorb the impact of a heavier adult passenger.

BRIEF DESCRIPTION OF THE DRAWINGS

FIG. 2 is a sectional view taken along the line 2—2 in FIG. 1 illustrating a first embodiment of the module of the invention;

FIG. 4 is a sectional view taken through the module of FIG. 1, illustrating a second embodiment of the module of the invention;

FIG. 5 is a sectional view taken along the line 5—5 of FIG. 4;

FIG. 6 is a sectional view taken along the line 6—6 of FIG. 4;

FIG. 6a is a sectional view taken along the line 6a—6a in FIG. 5; and

FIG. 7 is a sectional view taken along the line 7—7 in FIG. 5.

DETAILED DESCRIPTION OF THE PREFERRED EMBODIMENTS

Figure 1:
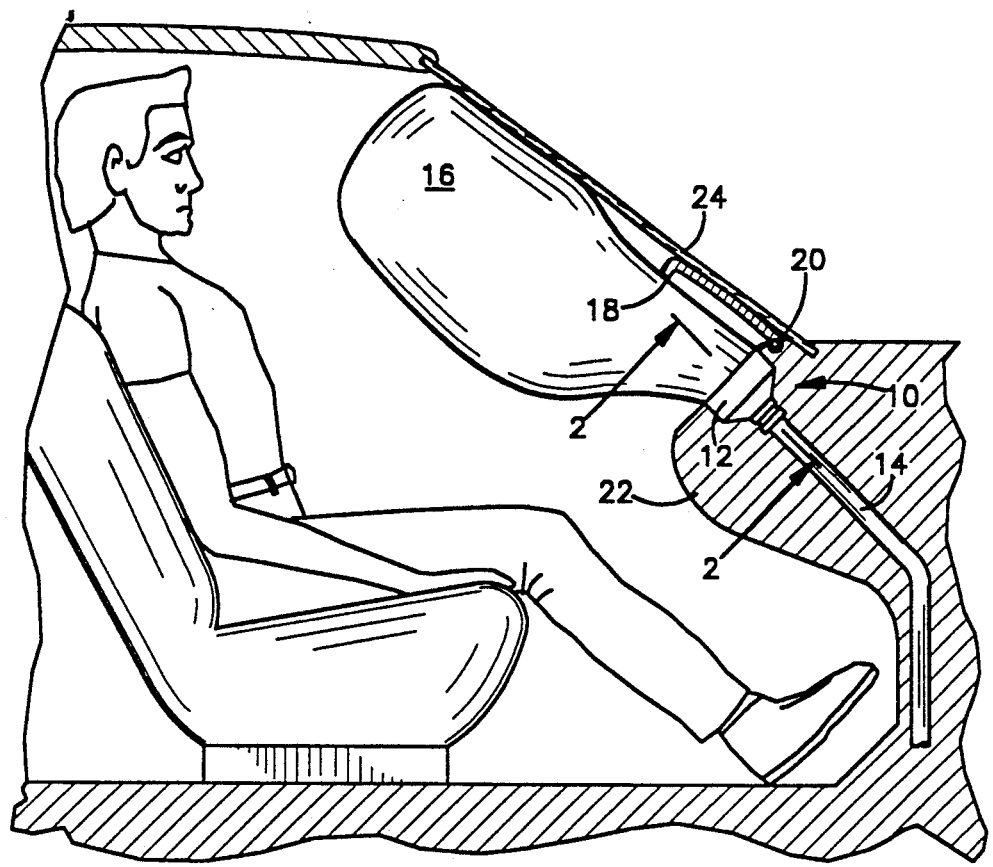
FIG. 1 is a side elevational view of a portion of a motor vehicle dashboard having installed therein a modularized aspirating/venting passenger passive restraint assembly produced according to the present invention.

Turning initially to FIG. 1 there is illustrated aspirating/venting passenger passive restraint module assembly 10 installed within the dashboard of a motorized vehicle, e.g., an automobile. For convenience in describing the present invention, the following description is provided with regard to the installation of the subject module 10 within an automobile. The invention should not, however, be considered as being limited to use with automobiles alone. Additional useful applications conceived by the applicant include the use of the subject module in a variety of motorized vehicles such as trucks, buses, vans and even water and air-borne craft, such as boats and airplanes.

Module 10 includes, in addition to means for inflating an inflatable passive restraint operatively associated therewith (not shown), base plate 12 having an open end and a closed end and conduit member 14 configured and adapted for permitting a reciprocal fluid flow into and out of air bag 16. The advantages of this reciprocal flow include: (1) a decrease in the amount of time required to deploy bag 16 due to the additive effect of air from outside the vehicle when the inflator means is actuated, (2) cooling of the gaseous combustion products produced by the inflator means to protect against the failure of bag 16 due to burnthrough by the hot gas and (3) passage of any toxic material in the combustion gas through conduit 14 to the exterior of the vehicle through either the firewall or the floorboards of the vehicle.

The recent emphasis on weight reduction for the purpose o of fuel conservation in motorized vehicles has created a need and a demand for a lighter weight passive restraint system. Plate 12 is thus preferably fabricated from a lightweight metal stamping, since the stamping process is both fast and inexpensive. In the preferred embodiment, plate 12 is formed of aluminum in order to minimize the weight of module 10. The plate 12 may also be formed of titanium or stainless steel.

The open end of base plate 12 is closed by cover member 18, connected at hinge 20 to vehicle dashboard 22 and forming a pivotable door thereupon. Upon actuation of the inflator means, cover member 18, which is not connected in any manner to module 10, is pushed upwardly against an inner surface of windshield 24 as passenger air bag 16 is inflated and deployed. This arrangement facilitates the installation and alignment of module 10 within dashboard 22.

Figure 3:
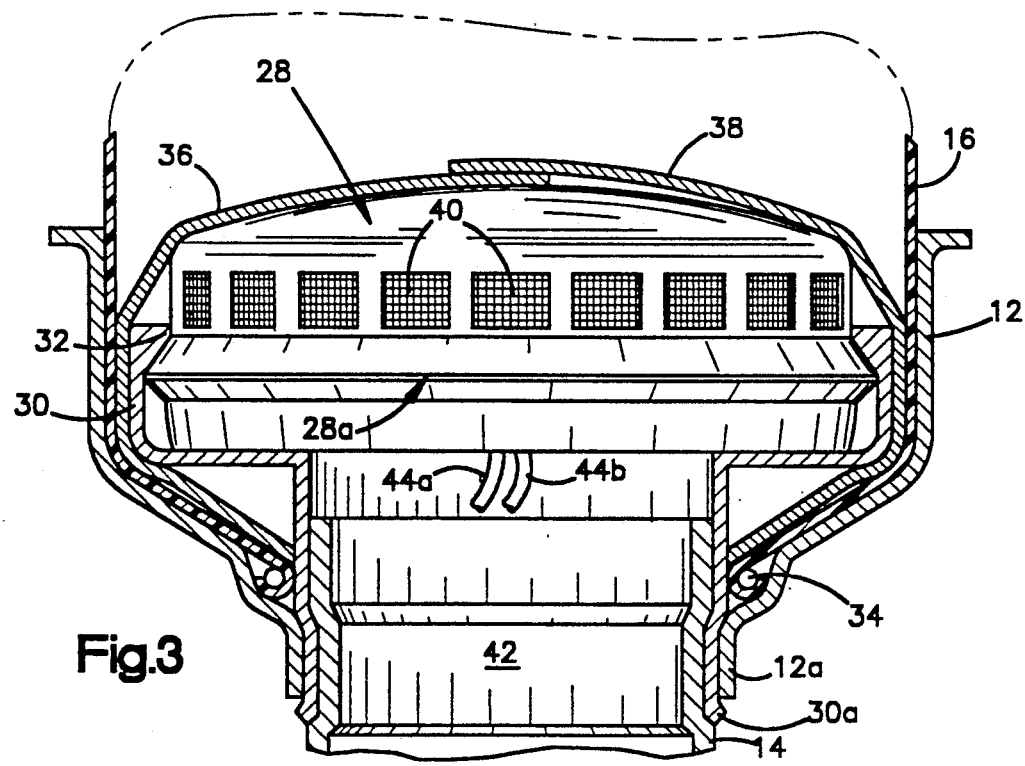
FIG. 3 is a sectional view taken along the line 3—3 in FIG. 2.

Turning now to FIGS. 2-3 there is illustrated a first embodiment of the present invention. As shown in FIG. 2, air bag 16 may be inflated by means comprising two separate and discrete inflator devices 26, 28, each having a combustion chamber within a housing, mounted and arranged within module 10 as described below. Although the internal arrangement of components within inflators 26, 28 is not a critical feature of the present invention, module 10 does require, in order to ensure that inflators 26, 28 are locked securely into position therein, that the subject inflator devices comprise, along at least a portion of their outer peripheral surface, an arcuate "shoulder" segment 26a, 28a which serves as a convenient locus for locking and aligning inflators 26, 28 within mounting plate 30. Plate 30 is configured and adapted to fit within base plate 12 as illustrated in FIGS. 2-3.

One type of inflator unit which is particularly suited and therefore preferred for use within module 10 of the present invention is that disclosed in applicant's application Ser. No. 07/233,191 filed Aug. 17, 1988, now U.S. Pat. No. 4,923,212, entitled "LIGHTWEIGHT NON-WELDED INFLATOR UNIT FOR AUTOMOBILE AIRBAGS" ("the magnaformed unit") the disclosure of which is incorporated herein by reference. Alternatively, in place of the magnaformed inflator unit, the type of unit disclosed in applicant's application Ser. No. 07/246,065 filed Sep. 16, 1988, now U.S. Pat. No. 4,907,819, entitled "LIGHTWEIGHT NON-WELDED GAS GENERATOR WITH ROLLED SPUN LIP" ("the rolled lip unit") is equally preferred. The disclosure of application Ser. No. 07/246,065 is also incorporated herein by reference. U.S. Pat. Nos. 4,923,212 and 4,907,819 are assigned to the assignee of the present application.

Moreover, while FIG. 2 illustrates a module 10 incorporating two magnaformed inflator units, this is only for the sake of convenience in illustrating the invention. It is to be understood that further embodiments of the invention may comprise, for example, two rolled lip inflator units or one magnaformed and one rolled lip unit. In addition, the amount and/or type of pyrotechnic propellant material placed in inflators 26, 28 may be adjusted as required to suit a variety of applications. Thus, for example, one inflator may be provided with a greater amount of propellant or with an equal amount of a faster burning propellant in order to vary the inflation profile of air bag 16.

As illustrated in FIG. 2, inflator units 26, 28 are positioned in horizontal spaced relation within stepped mounting plate 30, which is then seated within base plate 12. Mounting plate 30 terminates along an upper peripheral edge at curved finger 32. As used in the present application, the "upper" or "forward" portion of module 10 or any component part thereof is that portion closest to the vehicle occupants. In contrast, the "lower" or "rearward" portion is the part furthest removed from the vehicle passenger, i.e, closest to the vehicle firewall.

Upon initially positioning inflators 26, 28 within mounting plate 30, finger portion 32 thereof is located adjacent but spaced apart from arcuate shoulders 26a, 28a on the housings of these inflators. Finger 32 is subsequently sealed against the outer surfaces of inflator 26, 28 by a magnaforming process, such as that disclosed in U.S. Pat. No. 2,976,907 to Harvey et al. In the subject magnaforming process a variable magnetic field is created adjacent the workpiece. Subsequently, one or more force impulses set up by the magnetic field are directed against finger portion 32 of mounting plate 30, thus lockingly engaging finger 32 against shoulders 26a, 28a and thereby retaining inflators 26, 28 within mounting plate 30.

Applicant has determined that the best results are obtained with the subject magnaforming technique when the temper of the metal of which the components of module 10 are formed is as high as possible without being such that the metal cracks during the magnaforming process due to excessive brittleness. This ensures that module 10 can be constructed of lightweight materials (e.g., 201 or 304 stainless steel, aluminum or titanium) while still maintaining a sufficient degree of structural strength needed to withstand the forces generated upon combustion of the pyrotechnic propellant composition within the inflators. This is an important feature of the present invention since it is generally understood by those in the art that a reduction in vehicle weight is translatable into improved gas mileage for the vehicle.

Mounting plate 30, with inflators 26, 28 secured therein is configured and adapted as noted above to fit within base plate 12. Sandwiched between plates 12, 30 is a mouth portion of air bag 16. Bag 16 is formed of a durable fabric substrate coated with a layer of plastic, e.g., polyvinyl chloride (PVC), or an elastomer to prevent passage of the gaseous fluid therethrough. Thus both inflators 26, 28 are entirely enclosed within bag 16. Bag 16 is retained in position by locking bead 34, such as an elastomeric O-ring having a limited degree of flexibility, sewn within the bag mouth. Bead 34 is trapped between mounting plate 30 and base plate 12 during the formation of module 10 as described herein, thus eliminating the time-consuming steps of aligning and tightening numerous costly and cumbersome fasteners so as to maintain and secure bag 16 in place upon actuation of inflator units 26, 28.

Positioned inwardly of bag 16 are two sheets 36, 38 of a dense, flame and heat-resistant fabric material, (see, e.g., FIG. 3) such as DuPont KEVLAR®, which serves to prevent the passage of any molten particulate materials which may be ejected through diffuser ports 40 of inflators 26, 28. Sheets 36, 38 are secured at their lower end, adjacent locking bead 34 of air bag 16, between base plate 12 and mounting plate 30. At their upper end, i.e., above inflators 26, 28, sheets 36, 38 partially overlap one another. These overlapping portions may be secured together with the aid of, for example, a light coating of adhesive to maintain them in position during the formation of module 10.

Upon actuation of inflators 26, 28 the force of the gaseous combustion products exiting diffuser ports 40 immediately overcomes the bond between sheets 36, 38 and pushes them upwardly against an inner surface of the lower part of bag 16. Sheets 36, 38 thus provide an extra layer of protection for the inner surface of the bag to prevent scorching or burn-through by molten particulates carried within the gas stream. The upper portion of air bag 16 is typically folded so as to lie flat atop the overlapping fabric sheets until such time as inflators 26, 28 are actuated and bag 16 is deployed.

As illustrated in FIGS. 2-3 the lower, i.e., base, portion of both base plate 12 and mounting plate 30 each define an aperture, which apertures are positioned in substantially vertical alignment by seating mounting plate 30 with inflators 26, 26 magnaformed therein within base plate 12. The apertures of plates 12 and 30 are configured and adapted to permit the passage of a first, upper end of conduit 14 so as to retain and align the conduit in a manner to permit fluid communication between the inside of air bag 16 and the ambient atmosphere surrounding the vehicle.

Conduit 14, which is preferably formed from an engineering thermoplastic such as polyvinyl chloride (PVC), is inserted first through base plate 12 and thereafter through mounting plate 30 to a point below and spaced apart from the lower surface of inflators 26, 28. Annular groove 42 is provided around an upper terminal portion of conduit 14, which groove 42 is configured and adapted for locking engagement with skirt portion 30a depending from and formed integral with the lower surface of mounting plate 30. Positioned circumjacent to mounting plate skirt 30a is skirt 12a formed integral with and depending from the lower surface of base plate 12. Conduit 14 is lockingly engaged by both mounting plate 30 and base plate 12 by magnaforming, in a single operation, skirt 30a and overlapping skirt 12a into groove 42 in the manner described above. Several of the components of module 10 are thus simultaneously locked into place without the need for complex welding operations or for positioning and aligning a plurality of screw and/or bolt-type fasteners as was previously required by the prior art.

The module 10 thus formed provides an unobstructed flow path for ambient air from outside the vehicle to travel, i.e., through conduit 14 and thereafter past inflators 26, 28 into the interior of air bag 16. Upon deflation of bag 16, the path traveled by the gas is reversed and the bag contents are therefore exhausted out of the passenger compartment of the vehicle into the surrounding atmosphere through conduit 14. For this purpose, conduit 14 is configured and adapted to extend from module 10 through the firewall or the floorboards of the vehicle to permit fluid communication with the outside atmosphere.

As noted above, the addition of a variable volume of ambient atmosphere to the flow of gaseous pyrotechnic products produced upon activation of inflators 26, 28 provides several advantages to the operation of applicant's modularized passenger restraint system. First, the external air is substantially cooler than the gasses produced by inflators 26, 28 and thus it serves to cool the entire contents of bag 16. This feature is important in that if bag 16 of applicant's module 10 were to rupture for any reason or, due to some malfunction, to accidentally vent into the passenger compartment of the vehicle, the gasses thus released would exit bag 16 at a temperature calculated to prevent injury to the vehicle occupants. Secondly, the inclusion of the additional gas volume provided by the entry of the ambient atmosphere permits bag 16 to be inflated within a relatively shorter period of time than was heretofore possible. The aspiration effect additionally permits a reduction of about 15-20 weight percent in the amount of propellant utilized to inflate bag 16, thus allowing a concurrent reduction in the size, and therefore the weight of inflators 26, 28 utilized within module 10.

FIG. 3, wherein parts identical to those in FIG. 2 are identified with the same numerical designations, provides a view of one of the two inflator units and the means by which inflator 28 is secured within module 10. This view also clearly illustrates the overlapping arrangement of KEVLAR® sheets 36, 38 which aid in preserving the integrity of bag 16 by preventing impingement thereupon by molten particulates contained in the gas stream. Also depicted in a representational view in FIG. 3, as in FIG. 2, are electrical leads 44a, 44b which connect means associated with inflators 26, 28 for igniting their pyrotechnic charge (such as an explosive squib) with a remotely located sensor device adapted to identify the occurrence of a collision involving the vehicle and to thus actuate the passive restraint device within the vehicle.

Turning now to FIGS. 4-7, there is illustrated a further embodiment of the present invention utilizing a single linear, bilateral inflator device 46 comprising first and second combustion chambers in place of the two separate inflators 26, 28 as described above. The use of a single inflator unit 46 thus obviates the need for a separate mounting plate 30, whose main purpose within the above-described embodiment is to support and align the separate inflator units utilized in the subject embodiment in operative association. In the embodiment illustrated in FIGS. 4-7, therefore, inflator 46 is locked together with base plate 12 by a structural seal formed with the simple, efficient magnaforming procedure described herein.

In effecting a structural seal with the use of the subject magnaforming technique, a variable magnetic field is created adjacent the area where skirt portion 12a of base plate 12 overlaps tubular extension 48 of inflator 46. Subsequently, one or more force impulses set up by the magnetic field are directed against skirt 12a which, prior to this operation, initially extends substantially parallel to the outer wall 48a of tubular extension 48. The effect of these force impulses is to cause a portion of skirt 12a to flow into groove 48b in wall 48a so as to create a structural seal between mounting plate 12 and tubular extension 48, thus locking together inflator 46 and base plate 12. Thereafter, conduit 14 is affixed to tubular extension 48 with the use of a fitting (not shown) in a manner well-known in the art.

As illustrated in FIG. 4, linear bilateral inflator unit 46 is provided with two cylindrical combustion chambers 50, 52, within respective housings, bi-laterally arranged in a horizontal, i.e., linear, plane at the outer peripheral ends of inflator 46. A centrally located T-shaped portion 51, positioned between combustion chambers 50, 52 and comprising tubular extension 48, which projects substantially perpendicularly to the said chambers, serves as a structural support for chambers 50, 52.

The central T-shaped support 51 also houses the ignition means for initiating combustion of main propellant charge 54. The preferred ignition means is an electrically actuated squib device 56 containing a small charge of a combustible material. Squib 56 is normally connected via electrical leads 44a, 44b at least one remote sensing device (not shown) of a type well known in the art, located in, for example, the front bumper and/or side fender of the vehicle. Thus, the activation of squib 56 by a signal from the crash sensor is designed to simultaneously ignite propellant 54 stored within both combustion chambers 50, 52.

Propellant 54 may be supplied in a variety of physical forms. It may, for example, be stored within inflator 46 as a powder, or alternately in the form of a number of tablets ranging in size from an aspirin tablet to approximately that of an ALKA SELTZER ®. Although either arrangement will work equally well, the latter, i.e., tablet form, is preferred because of the ease with which such tablets may be handled in comparison to the use of bulky and cumbersome powders.

In order to prevent propellant 54 from leaking out of combustion chambers 50, 52 prior to ignition, the propellant is enclosed within an outer packaging or wrapping 58. The material of which packaging 58 is comprised may be selected from a variety of plastic wraps and metal foils, with the latter being preferred for use due to its ease of handling. Not only does packaging material 58 ensure that propellant 54 is securely maintained within combustion chambers 50, 52, but it also prevents propellant 54 from coming into contact with any moisture from the surrounding environment which may negatively affect the inflator's combustion capabilities due to caking or agglomeration of the propellant particles.

A variety of compositions, well known to those of ordinary skill in the art, may be utilized as propellants for the gas generator means chosen for inflating the air bag component of module 10. Applicant prefers the various compositions described in U.S. Pat. No. 3,895,098 to John F. Pietz, issued Jul. 15, 1975 and reissued as Re 32,584 on Jan. 26, 1988, entitled METHOD AND COMPOSITION FOR GENERATING NITROGEN GAS. The fastest burning (and therefore preferred) propellant compositions are those propellants taught by the subject patent which comprise a mixture of sodium azide and copper oxide.

Alternately, compositions substituting nickel and iron oxidizers may be utilized, but these generants, although capable of a slightly higher effective gas output than the $CuO/NaN_3$ mixture described above, often require the addition of an ammonium perchlorate burn rate enhancer to reach their full potential, as disclosed in U.S. Pat. No. 4,604,151 issued on May 4, 1986 to Knowlton et al., entitled METHOD AND COMPOSITION FOR GENERATING NITROGEN GAS INCLUDING AMMONIUM PERCHLORATE CATALYST. A variety of different gas generant compositions are operable within applicant's module 10, however, and the present invention should not be limited solely to the use of the compositions disclosed above.

In a further embodiment of the present invention, propellant 54 may be molded or extruded into a single porous grain conforming to the volume and the shape of combustion chambers 50, 52. An important feature to consider with the use of such a porous propellant grain, however, is to ensure that the grain is formed having a sufficient degree of porosity to provide a sufficient volume of gas to inflate an air bag within, for example, 30-60 milliseconds. Such a porous propellant grain is disclosed and claimed in U.S. Pat. No. 4,758,287 to John F. Pietz entitled POROUS PROPELLANT GRAIN AND METHOD OF MAKING SAME.

An important additional feature of the present embodiment of the subject invention is the ability of inflator 46 to operate with a comparatively reduced amount of propellant 54 in one combustion chamber, e.g., 50, with a proportionately larger amount of either the same or a different propellant 54 in the remaining combustion chamber, i.e., 52. Upon installation of module 10 in vehicle dashboard 22, inflator 46 may be aligned such that the gaseous combustion products from chamber 50 (having the relatively reduced amount of propellant) are directed to the lower portion of passenger air bag 16, where a child is most likely to impact in the event of a collision involving the automobile, whereas the remaining combustion chamber (i.e., 52) containing a comparatively greater amount of propellant, is aligned so as to direct the gas produced thereby to the middle and upper portions of the bag. Thus, these areas become comparatively firmer and are therefore able to absorb an adult's relatively greater weight during a collision.

The gases and molten particulates produced as a result of the ignition and subsequent combustion of propellant 54 exit cylindrically shaped combustion chambers 50, 52 through a first set of diffuser ports 60 which provide fluid communication between the combustion zone, i.e., where propellant 54 is located, and filtration zone 62 (illustrated in a representational view in FIG. 4) which anularly surrounds the combustion zone. Filtration zone 62 comprises a number of anularly disposed layers of wire mesh screen and inert inorganic spacer pads, described below in detail with reference to FIG. 6a. Thus, filtration zone 62 serves a two-fold purpose: (1) the removal of a substantial majority of molten particulates from the gas stream so that they do not enter and impact directly upon the inner surface of bag 16, thus possibly burning through the fabric of the bag with potentially disastrous consequences for the vehicle occupants and, (2) as a heat sink to cool the gas to a temperature approaching ambient such that, in the improbable event of a bag failure, the vehicle occupants are prevented from contact with the dangerously hot gases produced by the combustion of propellant 54.

As represented by curved arrows A in FIG. 4, the gases expelled from combustion zone within each of combustion chambers 50, 52 exits these zones at an angle of substantially 180° from a second set of diffuser ports 64 communicating with the interior of bag 16. This arrangement forces the gas to take a circuitous clockwise or counter clockwise route (as shown by arrows A) around the inner arcuate surface of each cylindrical combustion chamber, 50, 52, before exiting inflator 46 through ports 64, thus making the most effective use of the heat sink capacity of filtration zone 62 while also providing the maximum possible degree of filtration.

To seal the outer ends of inflator 46, end caps 66 are inserted into the open outer ends of combustion chambers 50, 52. Caps 66 are preferably U-shaped and stamped from a lightweight material, e.g., aluminum, in order to minimize their weight and therefor the weight of inflator 46. To maintain end caps 66 in position when inflator 46 is pressurized during operation, outer cylindrical walls 50a and 52a of corresponding combustion chambers 50, 52 are magnaformed into an annular groove 68 extending entirely around the outer periphery of each cap 66. In addition, along the inner end of both chambers 50 and 52, i.e., adjacent T-shaped support zone 51 containing squib 56, walls 50a, 52a are magnaformed into a second set of corresponding grooves 70 formed within the "head" of the "T" in order to place chambers 50, 52 in operative association with squib 56.

As with the first embodiment of the invention described above, utilizing several separate inflator devices as described above, inflator 46 is entirely enclosed within bag 16. This arrangement eliminates the need for cumbersome fasteners for attaching bag 16 to inflator 46 or base plate 12. Bag retention is thus accomplished as noted above by providing bead 34 within the mouth of bag 16 and then simply trapping the bead in place between base plate 12 and cylindrical walls 50a, 52a defining, respectively, combustion chambers 50, 52 when plate 12 is magnaformed onto tubular extension 48.

Turning now to FIG. 5, there is illustrated a rear plan view through tubular extension 48 of the means for supporting squib 56 within inflator 46. As may be discerned from the illustration, squib 56 is seated within an aperture defined by cross member 72 which bisects tubular extension 48. In one embodiment of the invention, the aperture and the squib base may be provided with corresponding male and female threads with squib 56 thus being screwed into the aperture. Alternately, in a different embodiment, squib 56 may be "potted" within the aperture with the use of an epoxy composition. In the preferred embodiment, squib 56 is simply crimped into place within the aperture, thus obviating the need for threads or adhesives. Electrical leads 44a, b extend below member 72 as shown and are remotely connected, as noted above, to means for sensing a sudden deceleration and/or collision involving the vehicle.

Member 72 defines corresponding-gas passages 74 on either side thereof adapted to permit a reciprocal fluid flow of ambient atmosphere into and out of air bag 16 through inflator 46. This supplemental volume of gas, which is drawn into bag 16 through conduit 14 from outside the vehicle by the aspirating effect created due to high velocity gases exiting inflator 46 through ports 64, especially angled ports 64a, 64b, serves to speed the inflation of the bag and to further cool the gases supplied by the combustion of propellant 54.

The bouncing action of bag 16 during its initial deployment also enhances the aspiration of ambient atmosphere through module 10 by creating a negative pressure which causes air to be ingested through conduit 14. Once air bag 16 is fully deployed, the positive pressure thus produced within the bag (at about 40 milliseconds) forces the gas within the bag to be vented back through the center of inflator 46 through module 10 and thus out of the vehicle via conduit 14 extending through the firewall or the floorboards of the vehicle.

FIG. 6 is provided to more clearly display the flow path of the gases within inflator 46, as previously discussed with regard to FIG. 4. These gases (represented by the arrows) flow arcuately through filtration zone 62 (illustrated in a representational view) in both clockwise and counterclockwise paths and eventually exit into air bag 16. As illustrated with respect to one representative combustion chamber (i.e., 50), the gas produced by the combustion of propellant 54 exits the combustion zone of chamber 50 through a first set diffuser ports 60 which are perforated through wall 76 defining the said combustion zone. Wall 76 is simply trapped in place without any requirement that it be mechanically attached to the inflator housing.

Upon exiting first diffuser ports 60, the hot gas, containing molten particulates, enters filtration zone 62 wherein it is deflected from outer cylindrical unperforated wall 50a forming the inflator housing. As a result of this arrangement, the gas is forced to travel 180° in an arcuate path around the inner surface of the combustion chamber, whereupon it flows into bag 16 through a second set of diffuser ports 64. Thus, the gas is both cooled and filtered as it passes through filtration zone 62, described below in further detail.

FIG. 6a provides a partial sectional view through filtration zone 62 of FIGS. 4 and 6 and illustrates the preferred filtration arrangement located within each combustion chamber 50, 52. Applicant recognizes that a number of variations are possible with regard to the filtering arrangement utilized in the present invention and should therefore not be restricted to the use of the preferred structure described herein. As illustrated in FIG. 6a, the core, i.e., the inner portion of filtration zone 62 is comprised of a number (preferably 5) of concentric layers 78 of a metal screen material, preferably of 28 mesh size, with the innermost layer positioned directly over and adjacent the first set of diffuser ports 60.

Extending circumferentially outwardly of screens 78 is a sandwich 80 comprised of several layers of metal screen 80a with alternating layers of an inert, inorganic ceramic fiber pad 80b. Pad 80b is formed from a mixture of alumina oxide and silica oxide and sold under the trade name FIBERFRAX ® by Sohio Carborundum, Inc. of Niagara Falls, N.Y., a division of Standard Oil Corporation. Ceramic pads 80b, being more dense than the 28 mesh screen, trap even the finest particulates traveling within the gas flow. Finally, a double layer of 28 mesh screen 82, located adjacent the inner arcuate surface of cylindrical wall 50a forming the housing of combustion chamber 50, abuts against the inner aspect of the second set of diffuser ports 64 to serve as a final check on the expulsion of unwanted particulate matter present within the gas. As noted above, the filtration arrangement is reproduced in the other combustion chamber 52 as well.

FIG. 7 generally illustrates the gas passage arrangement described above with regard to FIG. 5, except that FIG. 7 represents a sectional view taken along the vertical axis of tubular extension 48 in FIG. 5. Since the structure is unchanged between those two figures, i.e., only the perspective is different, the structural components comprising this aspect of the invention have been designated with the same identification number in both figures. The solid arrows represent the reciprocal flow of gas into and out of bag 16.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

I claim:

1. A motor vehicle passenger passive restraint module comprising:
   (a) a base plate member;
   (b) first and second inflator means for producing a sufficient amount of gaseous combustion product to substantially deploy expandable air cushion means operatively associated therewith within an interval between a primary collision involving a motor vehicle with an object external thereto and a secondary collision between a passenger within the motor vehicle and an interior portion of the motor vehicle, said first and said second inflator means being mounted within said base plate member, said first inflator means including a first inflator housing and a first combustion chamber therein, said second inflator means including a second inflator housing and a second combustion chamber therein, said first inflator housing being spaced from said second inflator housing;
   (c) expandable air cushion means secured within said base plate member, said air cushion means adapted to be substantially inflated by said first and second inflator means upon actuation thereof to prevent said secondary collision between the passenger and the interior portion of the motor vehicle; and
   (d) means secured to said base plate member in fluid communication with said first and second inflator means for permitting a reciprocal fluid flow between an interior portion of said expandable air cushion means and the ambient atmosphere surrounding the vehicle;
   said first and second inflator means and said reciprocal fluid flow means being maintained together in locking engagement with said base plate member.

2. The module of claim 1 wherein said base plate member is configured and adapted for installation within a dashboard portion of said vehicle by fastener means adapted for securing said member within said dashboard and wherein said member is fabricated from a relatively lightweight, corrosion-resistant, high tensile strength material.

3. The module of claim 2 wherein said relatively lightweight, corrosion-resistant, high tensile strength material is selected from a group consisting of aluminum, titanium and stainless steel.

4. The module of claim 3 wherein said base plate member comprises first skirt means formed integral with a lower portion thereof, said skirt means extending substantially perpendicularly from said lower portion and defining a first aperture within said base plate member configured and adapted for passage of at least a portion of said reciprocal fluid flow means.

5. The module of claim 1 wherein said expandable air cushion means is a motor vehicle passenger air bag, said air bag having means to facilitate locking engagement within said base plate member.

6. The module of claim 5 wherein said means to facilitate locking engagement of said air bag is a relatively flexible locking bead secured within a mouth portion of said air bag.

7. The module of claim 6 wherein said module further comprises mounting means for supporting and aligning said first and said second inflator means in horizontal spaced relation, said mounting means being sized for installation within said base plate member and adapted to secure said first and said second inflator means in operative association within said module.

8. The module of claim 7 wherein said mounting means comprises a stamped metal pan member formed of a relatively lightweight, corrosion-resistant, high-tensile strength material, said pan member comprising finger means adapted to form a structural seal with an outer surface of said first and said second inflator means.

9. The module of claim 8 wherein said base plate member comprises a first skirt means, said pan member comprises second skirt means formed integral with a lower base portion thereof and extending substantially perpendicularly therefrom, said first skirt means defining a first aperture, said second skirt means defining a second aperture within said pan member configured and adapted for passage of at least a portion of said reciprocal fluid flow means, said first and second apertures being maintained in a substantially vertical alignment upon installation of said mounting pan member within said base plate member.

10. The module of claim 9 wherein said air bag locking bead is trapped between said pan member and said base plate member such that said air bag is secured in surrounding relation to said first and said second inflator means upon formation of said module.

11. The module of claim 10 wherein said first inflator means is a magnaformed gas generator device, said magnaformed gas generator device comprising:
   (a) a domed diffuser member having a first open end and a second closed end;
   (b) a closure plate member sealing the open end of said diffuser member, thereby forming said first inflator housing;
   (c) combustible gas generant material located within a interior portion of said first inflator;
   (d) means for initiating combustion of said gas generant material, said initiating means positioned within said first inflator housing adjacent said gas generant material; and
   (e) means within said first inflator housing for filtering said gaseous combustion product prior to its discharge from said first inflator housing, said filtering means circumferentially surrounding said gas generant material adjacent an inner wall portion of said first inflator housing and adapted for cooling the gas and removing substantially all particulate matter therefrom,
   said open end of said diffuser member being magnaformed over an outer peripheral lip portion of said closure plate member to form a structural seal therebetween.

12. The module of claim 10 wherein at least one of said first and second inflator means is a rolled lip gas generator device, said rolled lip gas generator device comprising:
   (a) a domed diffuser member, having a first open end and a second closed end;
   (b) a closure plate member sealing the open end of said diffuser member, thereby forming one of said first and second inflator housings;
   (c) combustible gas generant material within an interior portion of said one of said first and second inflator housings;
   (d) means for initiating combustion of said gas generant material, said initiating means positioned within said one of said first and second inflator housings adjacent said gas generant material;
   (e) means within said one of said first and second inflator housings for filtering said gaseous combustion product prior to its discharge from said one of said first and second inflator housings, said filtering means circumferentially surrounding said gas generant material adjacent an inner wall portion of said one of said first and second inflator housings, and adapted for cooling gas and removing substantially all particulate matter therefrom,
   said open end of said diffuser member being rolled at an angle of about 180° over an outer peripheral edge portion of said closure plate member toward a bottom surface of said closure plate member to form a rolled lip, said rolled lip creating a non-welded structural seal between said diffuser member and said closure plate member, and
   (f) mean located external to said one of said first and second inflator housings for locking a peripheral circumferential skirt portion of said diffuser member at said open end against a bottom surface of said closure plate member to reinforce said non-welded seal between said closure plate member and said diffuser member.

13. The module of claim 11 wherein said first inflator housing further comprises an arcuate surface extending along at least a portion of an exterior peripheral surface thereof, said arcuate surface having a relatively greater diameter than a remaining portion of said first inflator housing and wherein said surface is configured and adapted to facilitate formation of a structural seal with said finger means on said pan member.

14. The module of claim 13 wherein said arcuate surface is a rounded shoulder located upon a portion of said first inflator housing wherein said diffuser member overlaps said closure plate member.

15. The module of claim 14 wherein said finger means comprises a rounded upper peripheral edge portion of said pan member, said structural seal being formed by magnaforming said finger means against said rounded shoulder upon said first inflator housing.

16. The module of claim 15 wherein said first inflator housing is fabricated from a relatively lightweight, corrosionresistant, high tensile strength material.

17. The module of claim 16 wherein said reciprocal fluid flow means comprises an elongated conduit having a first end and a second end, said first end configured and adapted to extend through said first and said second apertures in, respectively, said base plate member and said pan member to a location adjacent said first and second inflator means and secured within said module by a structural seal formed between said conduit and, respectively, said second and said first skirt means.

18. The module of claim 17 wherein said first end of said conduit is grooved along at least a portion of an outer surface thereof and said structural seal is created by substantially simultaneously magnaforming said second and said first skirt means into said groove.

19. The module of claim 18 wherein said conduit is formed from a material selected from an engineering thermoplastic and a lightweight, corrosion-resistant, high tensile strength metal.

20. The module of claim 19 wherein said second end of said conduit extends out of a passenger compartment of said vehicle through an aperture defined within an inner surface of said vehicle.

21. The module of claim 20 which further comprises at least one sheet of a dense fibrous material at a location above said first and said second inflator means within said air bag, said fibrous material adapted to inhibit passage therethrough of substantially all molten particulates produced upon actuation of said inflator means to prevent said particulates from burning through said bag.

22. A motor vehicle passenger passive restraint module for preventing, in the event of a primary collision involving said vehicle, the occurrence of a secondary impact between a passenger within said vehicle and a solid interior surface thereof, said module comprising:
   (a) a base plate member configured and adapted for installation within a dashboard portion of a motor vehicle by fastener means adapted for securing said plate within said dashboard, said member being formed from a relatively lightweight, corrosion-resistant, high-tensile strength material and comprising first skirt means formed integrally with a lower portion thereof, said first skirt means extending substantially perpendicular to said lower portion and defining a first aperture within said base plate member adapted for passage of at least a portion of means configured and adapted to permit a reciprocal fluid flow between an inner portion of said module and the ambient atmosphere surrounding said vehicle;
   (b) a stamped metal mounting pan member for supporting and aligning a first and a second magnaformed inflator device in horizontal spaced relation, said mounting pan member configured and adapted for installation within said base plate member so as to secure said first and said second inflator devices within said module, said mounting pan member comprising, along an upper peripheral edge portion thereof, finger means adapted for locking engagement with an outer surface of said first and second inflator devices and further comprising second skirt means formed integrally with a lower portion thereof, said second skirt means extending substantially perpendicularly to said lower portion and defining a second aperture within said mounting pan member adapted for passage of at least a portion of said reciprocal fluid flow means, said first and said second apertures being maintained in substantially vertical alignment upon installation of said mounting pan member within said base plate;
   (c) first and second magnaformed inflator devices lockingly engaged within said mounting pan member by a structural seal formed therewith, wherein each said magnaformed inflator device comprises
   (1) a domed diffuser member having a first open end and a second closed end;

(2) a closure plate member sealing the open end of said diffuser member, thereby forming an inflator housing;

(3) a sufficient amount of a combustible gas generant material located within an interior portion of said housing to produce, upon combustion thereof, a volume of a gaseous product sufficient to substantially inflate said passenger air bag within about 30-60 milliseconds;

(4) means for initiating combustion of said gas generant material, said initiating means positioned within said housing adjacent said gas generant; and (5) means within said housing for filtering said gaseous combustion product prior to its discharge from the inflator housing, said filtering means circumferentially surrounding said gas generant material adjacent an inner wall portion of said housing and adapted for cooling said gas and removing substantially all particulate matter therefrom, wherein said open end of said diffuser is magnaformed over an outer peripheral lip portion of said closure plate member to form a structural seal therebetween, and further wherein said inflator devices are lockingly engaged within said mounting pan member by magnaforming said finger means located thereupon against a rounded shoulder located upon at least a portion of said inflator housing wherein said diffuser member overlaps said closure plate member;

(d) a motor vehicle passenger air bag comprising a relatively flexible locking bead secured within a mouth portion thereof, said air bag being secured within said module in surrounding relation to said first and said second magnaformed inflator devices by trapping said locking bead between said base plate member and said stamped metal mounting pan member upon formation of said module; and (e) an elongated conduit member formed from a material selected from an engineering thermoplastic and a lightweight, corrosion-resistant high tensile strength material, said conduit member adapted to permit fluid communication between an inner portion of said passenger air bag and said ambient atmosphere surrounding said vehicle upon actuation of said magnaformed inflator devices and having a first end and a second end, said first end being grooved along at least a portion of an outer peripheral surface thereof and extending through said first and said second apertures in, respectively, said base plate member and said stamped metal mounting pan member to a location adjacent said first and said second magnaformed inflator devices, said conduit member secured within said module by a structural seal formed by magnaforming a portion of, respectively, said second and said first skirt means into said groove, and said conduit member extending out of a passenger compartment of said motor vehicle through an aperture defined within an inner structural surface of said vehicle.

23. A motor vehicle passenger passive restraint module for preventing, in the event of a primary collision involving said vehicle, the occurrence of a secondary impact between a passenger within said vehicle and a solid interior surface thereof, said module comprising:

(a) a base plate member configured and adapted for installation within a dashboard portion of a motor vehicle by fastener means adapted for securing said plate within said dashboard, said member being formed from a relatively lightweight, corrosion-resistant, high-tensile strength material and comprising first skirt means formed integrally with a lower portion thereof, said first skirt means extending substantially perpendicular to said lower portion and defining a first aperture within said base plate member adapted for passage of at least a portion of means configured and adapted to permit a reciprocal fluid flow between an inner portion of said module and the ambient atmosphere surrounding said vehicle;

(b) a stamped metal mounting pan member for supporting and aligning a first and a second rolled lip inflator device in horizontal spaced relation, said mounting pan member configured and adapted for installation within said base plate member so as to secure said first and said second inflator devices within said module, said mounting pan member comprising, along an upper peripheral edge portion thereof, finger means adapted for locking engagement with an outer surface of said first and second inflator devices and further comprising second skirt means formed integrally with a lower portion thereof, said second skirt means extending substantially perpendicularly to said lower portion and defining a second aperture within said mounting pan member adapted for passage of at least a portion of said reciprocal fluid flow means, said first and said second apertures being maintained in substantially vertical alignment upon installation of said mounting pan member within said base plate;

(c) first and second rolled lip inflator devices lockingly engaged within said mounting pan member by a structural seal formed therewith, wherein each said rolled lip inflator device comprises (1) a domed diffuser member, having a first open end and a second closed end;

(2) a closure plate member sealing the open end of said diffuser member, thereby forming an inflator housing;

(3) a sufficient amount of a combustible gas generant material within an interior portion of said housing to produce, upon ignition thereof, a volume of a gaseous product sufficient to substantially inflate an automobile air bag within about 30-60 milliseconds;

(4) means for initiating combustion of said gas generant material, said initiating means positioned within said housing adjacent said gas generant;

(5) means within said housing for filtering said gaseous combustion product prior to its discharge from the inflator housing, said filtering means circumferentially surrounding said gas generant material adjacent an inner wall portion of said housing, and adapted for cooling said gas and removing substantially all particulate matter therefrom, said open end of said diffuser member being rolled at an angle of about 180° over an outer peripheral edge portion of said closure plate member toward a bottom surface of said closure plate member to form a rolled lip, said rolled lip creating a non-welded structural seal between said members, and (6) means located external to said housing for locking a peripheral circumferential skirt portion of said diffuser member at said open end against a bottom surface of said closure plate member to reinforce said non-welded seal between said closure plate member and said diffuser member, wherein said rolled lip inflator devices are lockingly engaged within said mounting pan member by magnaforming said finger means located thereupon against a rounded shoulder located upon at least a portion of said inflator housing wherein said diffuser member overlaps said closure plate member.

24. A motor vehicle passenger passive restraint module for preventing, in the event of a primary collision involving said vehicle, the occurrence of a secondary impact between a passenger within said vehicle and a solid interior surface thereof, said module comprising:

(a) a base plate member configured and adapted for installation within a dashboard portion of a motor vehicle by fastener means adapted for securing said plate within said dashboard, said member being formed from a relatively lightweight, corrosion-resistant, high-tensile strength material and comprising first skirt means formed integrally with a lower portion thereof, said first skirt means extending substantially perpendicular to said lower portion and defining an aperture within said base plate member adapted for passage of means configured and adapted to permit a reciprocal fluid flow between an inner portion of said module;

(b) a linear, bilateral inflator device installed within said base plate and secured thereto by a first structural seal formed therebetween, said inflator device comprising 1) first and second combustion chambers positioned substantially horizontally at, respectively, a first end and a second end of said inflator, each said combustion chamber comprising i) a cylindrically shaped propellant chamber extending along substantially an entire inner longitudinal axis of said combustion chamber and communicating, through a first inner end of said chamber in contact relation with a central support member of said inflator device, with a similarly disposed propellant chamber in an other one of said combustion chambers such that, upon actuation of ignition means for initiating combustion of a pyrotechnic gas-generating composition stored therein, said pyrotechnic gas-generating composition in both said first and said second combustion chambers is ignited substantially simultaneously;

ii) an anularly shaped filtration chamber disposed outwardly adjacent said cylindrical propellant chamber and positioned in substantially circumjacent relation thereto, said filtration chamber comprising a plurality of means for cooling and filtering said gaseous combustion products produced upon ignition of said pyrotechnic gas-generating composition;

iii) a cylindrical outer wall portion, substantially surrounding said annular filtration chamber along a longitudinal axis thereof, said wall portion being adapted to form an outer housing of said combustion chamber; and iv) an end cap member for sealing a second outer peripheral end of said combustion chamber, said cap member being secured within said cylindrical outer wall portion by a second structural seal formed therebetween, said second structural seal created by magnaforming a portion of said cylindrical outer wall into a grooved outer surface of said end cap member;

2) a T-shaped central support member located between said first and said second combustion chambers, said support member having first and second opposed grooved sides and secured, at said first side thereof, to said first inner end of said first combustion chamber and, at a said second side thereof, to said first inner end of said second combustion chamber, by, respectively, a third and a fourth gas-tight structural seal formed therebetween, said third and fourth gas-tight seals being created by magnaforming a portion of said cylindrical outer wall of, respectively, said first and said second combustion chamber into a corresponding one of said first and second grooved sides of said inflator support member, said support member further comprising a tubular stem portion projecting at least partially through said aperture in said base plate member and aligned substantially perpendicularly to a longitudinal axis of said first and said second combustion chambers, said stem portion being grooved along an outer wall surface thereof to facilitate formation of said first structural seal between said base plate member and said inflator device and having installed therein an electrically activated squib for initiating combustion of said pyrotechnic gas-generating composition stored in both said first and said second combustion chambers, said first structural seal being created by magnaforming at least a portion of said skirt upon said base plate member into said groove on said tubular stem portion of said inflator device;

(c) a motor vehicle passenger air bag comprising a relatively flexible locking bead within a mouth portion thereof, said air bag being secured within said base plate member in surrounding relation to said linear bilateral inflator device by trapping said locking bead between said inflator device and said base plate member; and (d) an elongated conduit member having a first end and a second end, said first end being releasably coupled to a terminal portion of said tubular stem and said second end extending out of a passenger compartment of said vehicle through an aperture defined by an inner structural surface of said vehicle, wherein a first one of said first and said second combustion chambers is adapted to contain a greater amount of said pyrotechnic gas-generating composition relative to a second one of said chambers and wherein the gaseous combustion products produced by said combustion chamber having said greater amount of said composition is directed towards an upper portion of said expandable passenger air bag while the combustion products produced by the remaining combustion chamber, containing a relatively lesser amount of said composition, is directed towards a lower portion of said bag, so as to provide at least two zones of differential gas pressure within said bag upon actuation of said inflator device, wherein a lower portion of said bag is relatively less pressurized than an upper portion thereof.

25. A motor vehicle passenger passive restraint module comprising:

(a) a base plate member;

(b) first and second inflator means for producing a sufficient amount of gaseous combustion product to substantially deploy expandable air cushion means operatively associated therewith within an interval between a primary collision involving a motor vehicle with an object external thereto and a secondary collision between a passenger within the motor vehicle and an interior portion of the motor vehicle, said first and said second inflator means being mounted within said base plate member, said first inflator means including a first inflator housing with a first combustion chamber therein and a first diffuser means, said second inflator means including a second inflator housing with a second combustion chamber therein and a second diffuser means;

(c) expandable air cushion means secured within said base plate member, said air cushion means adapted to be substantially inflated by said first and second inflator means upon actuation thereof to prevent said secondary collision between the passenger and the interior portion of the motor vehicle; and (d) means secured to said base plate member in fluid communication with said first and second inflator means for permitting a reciprocal fluid flow between an interior portion of said expandable air cushion means and the ambient atmosphere surrounding the vehicle, said first and second inflator means being located such that the reciprocal fluid flow is permitted to move through an area located between said first and second diffuser means, said first and second inflator means and said reciprocal fluid flow means being maintained together in locking engagement with said base plate member.

26. The module of claim 25 wherein said expandable air cushion means is a motor vehicle passenger air bag, said air bag having means to facilitate locking engagement within said base plate member, said means to facilitate locking engagement of said air bag including a relatively flexible locking bead secured with a mouth portion of said air bag;

said first and said second inflator means are joined in operative association within a linear bilateral inflator device installed within said base plate member and secured thereto by a first gas-tight structural seal, said first and second combustion chambers being positioned substantially horizontally at, respectively, a first end and a second end of said inflator device;

said inflator device having a T-shaped central support member located between said first and said second combustion chambers and secured, at a first side thereof, to said first combustion chamber and, at a second side thereof, to said second combustion chamber, said support member further comprising a tubular stem portion projecting substantially perpendicularly to a longitudinal axis of said first and said second combustion chambers, said stem portion containing ignition means for initiating combustion of a pyrotechnic gas-generating composition stored in both said first and second combustion chambers;

wherein said first and second combustion chamber are each adapted to supply differing amounts of a gaseous product, produced due to the combustion of said pyrotechnic gas-generating composition stored therein, so as to create at least two zones of differential pressure within said air bag.

27. The module of claim 26 wherein an outer wall portion of said tubular stem is grooved to facilitate formation of said first structural seal between said base plate member and said inflator device.

28. The module of claim 27 wherein said first structural seal is created by magnaforming at least a portion of said base plate member into said groove on said tubular stem portion of said inflator device.

29. The module of claim 28 which further comprises an elongated conduit member having a first end and a second end, said first end being releasably coupled to a terminal portion of said tubular stem and said second end extending out of a passenger compartment of laid vehicle through an aperture defined by an inner structural surface of said vehicle.

30. The module of claim 29 wherein said conduit is formed from a material selected from an engineering thermoplastic and a lightweight, corrosion-resistant, high tensile strength material.

31. The module of claim 26 wherein a first one of said first and said second combustion chambers contains a greater amount of said pyrotechnic gas generating composition relative to a second one of said chambers and wherein the gaseous product produced within said chamber having said relatively greater amount of said composition is directed toward a first zone of said passenger air bag while the gaseous product produced within the remaining one of said first and second chambers, containing a relatively lesser amount of said composition, is directed toward a second zone of said air bag.

32. The module of claim 31 wherein said first zone is located in an upper portion of said passenger air bag and said second zone is located in a lower portion of said air bag, such that said lower portion is relatively less pressurized than said upper portion of said air bag.

33. The module of claim 26 wherein said linear bilateral inflator device is fabricated from a relatively lightweight, corrosion-resistant, high tensile strength material.

34. The module of claim 33 wherein said relatively lightweight, corrosion-resistant, high tensile strength material is selected from among aluminum, titanium and stainless steel.

35. The module of claim 26 wherein said first and said second combustion chambers each comprise:

(a) a cylindrically shaped propellant chamber extending along substantially an entire inner longitudinal axis of said combustion chamber and communicating, through a first inner end of said chamber in contact relation with said central support member of said inflator device, with a similarly disposed propellant chamber in an other one of said combustion chambers such that, upon actuation of said ignition means, said pyrotechnic gas-generating composition in both said first and said second combustion chambers is ignited substantially simultaneously;

(b) an anularly shaped filtration chamber disposed outwardly adjacent said cylindrical propellant chamber and positioned in substantially circumjacent relation thereto, said filtration chamber comprising a plurality of means for cooling and filtering said gaseous combustion products produced upon ignition of said pyrotechnic gas-generating composition; and (c) a cylindrical outer wall portion substantially surrounding said annular filtration chamber along a longitudinal axis thereof, said wall portion being adapted to form an outer housing of said combustion chamber, and (d) an end cap member for sealing a second outer peripheral end of said combustion chamber, said cap member being secured within said cylindrical outer wall portion by a second structural seal formed therebetween, said second seal created by magnaforming a portion of said cylindrical outer wall into a grooved outer surface of said end cap member.

36. The module of claim 35 wherein said first and said second combustion chambers are each joined at their first inner end to, respectively, a first end and a second end of said central support member of said inflator device by, respectively, a third and a fourth structural seal, said third and fourth seals formed by magnaforming a portion of said cylindrical outer wall of each said combustion chamber to a corresponding grooved outer wall portion on said central support member.

37. The module of claim 35 wherein each said propellant chamber is defined by an inner cylindrical boundary wall which is trapped in place within said respective combustion chamber, said inner boundary wall being provided with a first set of diffuser ports providing fluid communication between said propellant chamber and said filtration chamber within each said combustion chamber.

38. The module of claim 37 wherein each said combustion chamber further comprises a second set of diffuser ports, defined by said wall comprising said outer housing of said chamber, said second set of diffuser ports providing fluid communication between said filtration chamber and an interior portion of said passenger air bag and further being aligned in at least one substantially linear row positioned substantially 180° out of alignment with said first set of ports, such that the gaseous combustion product flowing out of said propellant chamber upon ignition of said pyrotechnic gas-generating composition, through said first set of diffuser ports, is directed in an arc of substantially 180° through said filtration chamber prior to entering said air bag through said second set of diffuser ports in order in maximize a degree of cooling and filtration of said products thus obtained.

39. The module of claim 28 wherein said flexible locking bead within said air bag mouth portion is trapped between said base plate member and said inflator device upon formation of said first structural seal therebetween.

* * * * *